United States Patent [19]

Hansen et al.

[11] Patent Number: 5,670,723
[45] Date of Patent: Sep. 23, 1997

[54] ISOLATED LINER FOR AN ELECTROMAGNETIC FLOWMETER

[75] Inventors: Henning Max Hansen, Sønderborg; Hans Jørgen Pedersen, Nordborg; Frands Wulff Voss; Niels Gade, both of Sønderborg, all of Denmark

[73] Assignee: Danfoss A/S, Nordborg, Denmark

[21] Appl. No.: 601,008

[22] PCT Filed: Aug. 17, 1994

[86] PCT No.: PCT/DK94/00308
§ 371 Date: Feb. 27, 1996
§ 102(e) Date: Feb. 27, 1996

[87] PCT Pub. No.: WO95/05579
PCT Pub. Date: Feb. 23, 1995

[30] Foreign Application Priority Data

Aug. 19, 1993 [DE] Germany ............ 43 27 876.0

[51] Int. Cl.$^6$ ............................................. G01F 1/58
[52] U.S. Cl. ............................ 73/861.12; 29/593
[58] Field of Search ................... 73/861.09, 861.12, 73/861.17; 138/140, 146, 147; 29/593

[56] References Cited

U.S. PATENT DOCUMENTS 3,750,468  8/1973  Grauer ................... 73/861.12
4,281,552  8/1981  Nissen et al. ............ 73/861.12
4,785,672  11/1988 Picone .................... 73/861.12

*Primary Examiner*—Richard Chilcot
*Assistant Examiner*—Harshad Patel
*Attorney, Agent, or Firm*—Lee, Mann, Smith, McWilliams, Sweeney & Ohlson

[57] ABSTRACT

A measuring section for an electromagnetic flowmeter is provided having a metallic measuring tube made of a non-magnetic material, a set of magnetic coils for generating a magnetic field in a direction substantially at fight angles to the direction of flow, an electrode arrangement which is arranged substantially at fight angles to the direction of the magnetic field and substantially at right angles to the direction of flow, and an electrical insulator on the inside of the measuring tube, and also a method for the manufacture of this measuring section. Here, it is desirable for manufacture to be carried out with a relatively high degree of reliability. For that purpose, the insulator is constituted by a surface layer of metal oxide or metal nitride having a thickness of more than 10 μm an on the inside of the measuring tube. The inside of the measuring tube can be oxidized or nitrogenized for that purpose and a metal oxide or a metal nitride is deposited on the resulting oxide or nitride layer.

15 Claims, 1 Drawing Sheet

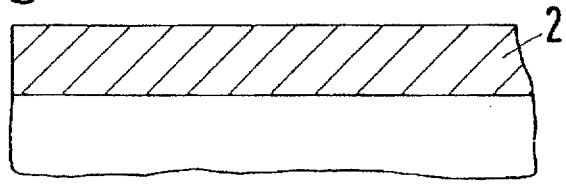
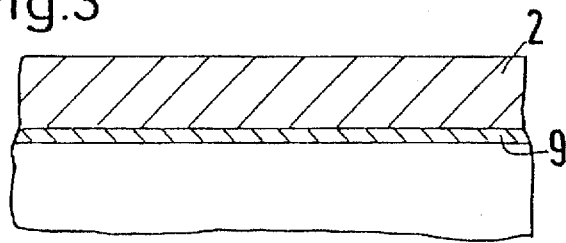
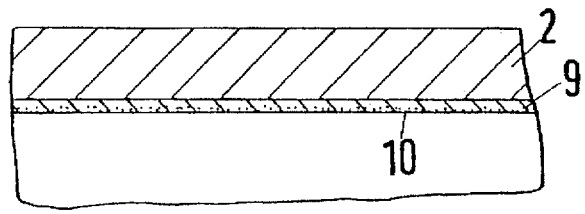
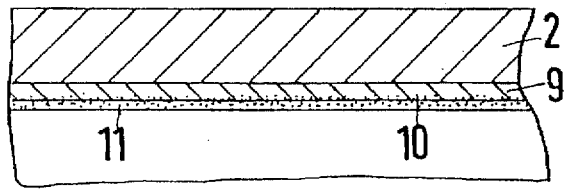
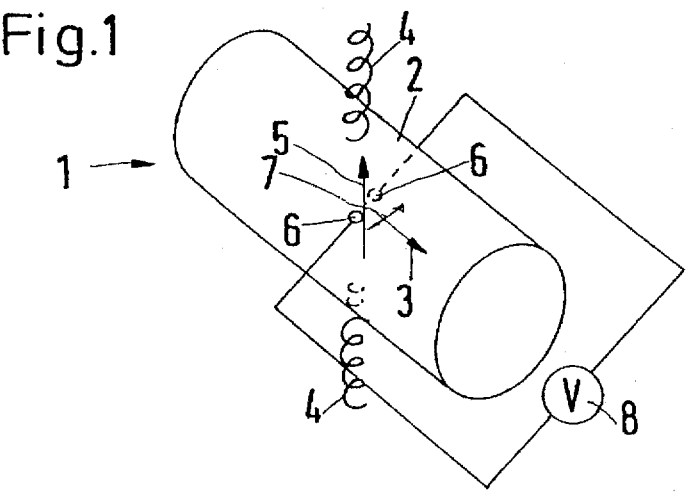

ISOLATED LINER FOR AN ELECTROMAGNETIC FLOWMETER

The invention relates to a measuring section for an electromagnetic flowmeter having a metallic measuring tube made of a non-magnetic material, a set of magnetic coils for generating a magnetic field in a direction substantially at right angles to the direction of flow, an electrode arrangement which is arranged substantially at right angles to the direction of the magnetic field and substantially at right angles to the direction of flow, and an electrical insulator on the inside of the measuring tube; the invention also relates to a method for the manufacture of a measuring section in which an insulator is arranged on the inside of the measuring tube.

Such measuring sections serve to determine the rate of flow of fluids, for example, in order to be able to dispense the fluids in the correct volume. The range of application extends from very small measuring tubes of a few square millimetres in cross-section to quite large measuring tubes which have a considerably larger flow cross-section. These last-mentioned tubes in particular have to be capable of bearing the weight and pressure of the fluid flowing through them without being adversely affected thereby. For that reason, in many cases a metallic material, such as aluminium or stainless steel, is selected. So that the magnetic field is not disrupted, it is a prerequisite that the material of the measuring tube is non-magnetic, that is to say, does not influence the magnetic field. As most metallic materials are electrically conductive, however, electrical insulation has to be provided between the fluid and the metal tube, otherwise the measuring tube itself would short-circuit the voltage created by the fluid flowing past and the magnetic field and prevent measurement taking place. The insulation must satisfy various requirements here. On the one hand it must have the necessary very high electrical resistance in order to be able to act as an electrical insulator. On the other hand it must, of course, also be resistant to the fluids flowing through. In many cases there is an added requirement for a certain thermal stability, especially when the flowmeter is used in systems which have to be cleaned from time to time, for example in the food industry, where for reasons of hygiene cleaning has to be carried out at temperatures far in excess of 100° C. and with cleaning agents that are in some cases corrosive. Plastics materials that in themselves have the necessary dielectric and insulating properties cannot normally be considered for this purpose because they are not able to withstand the elevated temperatures.

U.S. Pat. No. 3,750,468 discloses a measuring section for an electromagnetic flowmeter in which a tubular insert of aluminium oxide is inserted in a titanium tube. This insert serves electrically as the insulator. It is also sufficiently resistant for the majority of applications, and is in particular resistant to relatively high temperatures and has a certain resistance to corrosive fluids.

The manufacture of such a measuring section is not without problems, however. The insert must lie as closely as possible against the metal tube at all points, that is to say, for its entire length and around its entire circumference. This requires very precise pre-machining so that the outside of the insert and the inside of the metal tube have a cross-section that is as accurately circular as is possible. In addition, the external dimension of the insert and the internal dimension of the tube must be matched to one another exactly, so that the fit of the insert in the tube can be achieved, for example, by shrinking. Even when the shrinking process, in which the metal tube is heated, pushed onto the insert and then cooled, is carried out with the required care, now and then the insert may not be able to withstand the mechanical stresses occurring in the process, and will sustain damage. In many cases, such damage, which can be in the form of hairline cracks, for instance, goes unnoticed, so that the measuring section cannot operate with the required accuracy.

The invention is therefore based on the problem of manufacturing a measuring section with a greater reliability.

This problem is solved in the case of a measuring section of the kind mentioned in the introduction in that the insulator is constituted by a surface layer of metal oxide or metal nitride having a thickness of more than 10 μm on the inside of the measuring tube.

The insulator is therefore no longer formed by a separate component that has to be fixed in the measuring tube, but by a metal oxide or metal nitride layer in the form of a surface layer. The thickness of more than 10 μm means that the necessary electrical insulating properties are guaranteed. Metal oxide or metal nitride also has the necessary resistance to elevated temperatures and corrosive fluids.

The surface layer is preferably intimately bonded to the measuring tube. This bond is more than a plain clinging or adhesion to the measuring tube. To the contrary, the bond is a eutectic bond, a covalent bond or an ionic bond or the like, in which a bond between the metal oxide or metal nitride and the inside of the measuring tube is effected on an atomic basis.

Advantageously, a metal layer comprising the metal of the surface layer is arranged between the surface layer and the measuring tube. This metal layer can firstly be bonded very strongly to the metal of the measuring tube. In this case an alloy is formed in the boundary region between the metal of the measuring tube and the metal of the metal layer. Secondly, the metal layer can oxidize or nitrogenize or be oxidized or nitrogenized at its surface, so that the surface layer of metal oxide or metal nitride lying thereon finds a base to which it is able to affix itself very intimately. It has been shown, in fact, that in many cases it is easier for an oxide to attach to an oxide or a nitride to attach to a nitride than to metal itself.

It is especially preferred here for the measuring tube and the metal layer to be formed from the same material. The metal tube and the metal layer can even be of one-piece construction, so that the metal layer is no longer distinguishable. Nevertheless, it is functionally present as carrier for the initial oxide or nitride layer on which the surface layer is built up.

There is preferably a eutectic bond between the measuring tube and the metal layer, or the measuring tube and the metal layer are of one-piece construction and the surface layer is deposited in the form of a crystalline structure on the metal layer. The eutectic bond between the measuring tube and the metal layer enables an especially intimate bond between these two portions of the measuring tube to be achieved. This bond can in practice be just as intimate as in the case of a one-piece construction. Because a thin layer of oxide or nitride has already formed on the inside of the measuring tube (in a one-piece construction) or the metal layer, excellent anchorage points or bonding points are present for the crystalline structure, which is able to attach itself as the surface layer.

In an especially preferred construction, the metal layer is formed from tantalum and the surface layer is formed from tantalum pentoxide. A high strength can consequently be combined with good electrical insulation.

In another alternative, the metal layer comprises titanium and the surface layer comprises titanium nitride. Titanium also has a high mechanical strength. Titanium nitride exhibits a good resistance to many fluids, including corrosive fluids.

The problem is solved in the case of a method of the kind mentioned in the introduction in that the inside of the measuring tube is oxidized or nitrogenized and a metal oxide or a metal nitride is attached to the resulting oxide or nitride layer.

Most metals oxidize under the influence of atmospheric oxygen. The resulting oxide layer does not, however, achieve the required thickness of 10 μm. To the contrary, the thickness of the layer formed by natural oxidation fluctuates round about 1 μm, which will not normally be adequate for the required electrical insulation. The creation of a thicker oxide layer poses problems, however. For that purpose, oxygen atoms have to be introduced deep into the surface of the metal. On the other hand, depositing a metal oxide on the pure metal is not very easy because here the required bonding forces in the atomic range can often not be achieved. By preparing the inside of the measuring tube, namely oxidizing or nitrogenizing it, a kind of bonding or retaining layer has already been achieved on the inside, to which the oxide or nitride layer can be attached with the required thickness.

Before the inside of the measuring tube is oxidized or nitrogenized, a metal layer is preferably deposited on the inside of the measuring tube and this metal layer is oxidized or nitrogenized. Deposition of a metal layer can normally be effected with the required bonding force. There are numerous possible combinations of different metals which nearly all have adequate bonding forces to achieve the required intimate bond between the metal tube and the metal layer. The metal of the metal layer can be selected so that the layer formed on its surface by natural or artificial oxidation or nitrogenization enters into the desired bond with the oxide or nitride layer that is to be attached.

The metal layer is preferably applied by electrolysis. Electrolysis is a method known per se. Combined with the invention, this application method is especially advantageous, however, because the desired layer thickness of the metal layer can be achieved relatively quickly and with the desired high accuracy.

The metal of the metal layer is preferably the same as that of the oxide or nitride layer. Because the metal layer is oxidized or nitrogenized at its free surface there is already an oxide or nitride layer there, even if only a thin one, to which the oxide or nitride to be subsequently applied is able to attach itself with the required strength.

It is especially preferable for the oxide or nitride layer to be created by growing crystals on the oxidized or nitrogenized surface. A so-called sol-gel method, for example, can be used for that purpose, in which the already oxidized surface on the inside of the tube is exposed to a ceramic or metal oxide solution. Because the oxide or nitride layer produced naturally or by artificial means on the inside of the metal tube provides the necessary crystallisation nuclei, crystallisation can be carried out with the required reliability, speed and precision.

In another alternative, the oxide or nitride layer is created by chemical vapour deposition or sputtering. The chemical vapour deposition method is also known by the abbreviation CVD. In both methods the oxide or nitride is supplied to the surface with a certain energy which produces the necessary attachment of the nitride or oxide to the surface.

In another advantageous construction, it is also possible for the oxide or nitride layer to be formed by accelerated oxidation or nitrogenization of the inside of the measuring tube. Examples of methods used to achieve this aim include ion implantation, plasma spraying or treatment with strongly oxidizing reagents, in particular oxalic acid. Although it is possible in all cases to achieve the necessary thickness of the oxide layer of 10 μm or more, a relatively large effort is required to implement these methods.

The invention is described hereinafter with reference to a preferred embodiment in conjunction with the drawing, in which FIG. 1 shows a diagrammatic representation of a measuring section and FIGS. 2 to 5 show four fragmentary views of the manufacture of a measuring tube.

A measuring device 1 comprises a measuring tube 2 through which the fluid flows in the direction of an arrow 3. A magnetic arrangement 4 produces a magnetic field in the direction of an arrow 5, the direction of the magnetic field lying at right angles to the direction of flow 3. Furthermore, an electrode arrangement 6 is provided substantially at right angles to the direction of flow 3 and to the direction of the magnetic field 5; the electrode arrangement is connected to a voltage meter 8 and measures components of an electrical field which run in the direction of arrow 7, which in its turn is at right angles both to the direction of flow 3 and to the magnetic field direction 5.

The measuring tube 2 is made from a non-magnetic material, such as stainless steel, aluminium, titanium or tantalum. Non-magnetic is intended here to mean that the magnetic field 5 generated by the magnetic arrangement 4 is not influenced or disrupted by the measuring tube 2.

Although such metals are non-magnetic, they are still electrically conductive, so that they have to be insulated from the fluid flowing through. The insulation is effected with the aid of a metal oxide layer on the inside of the tube, the manufacture of which will be explained in detail below. Similarly, of course, a metal nitride can also be deposited on the inner surface of the metal tube 2.

A metal layer 9 is first of all deposited (FIG. 3) on the "bare" metal tube 2 of FIG. 2. This can be achieved, for example by means of an electrolytic method. In that case, a eutectic bond is formed between the measuring tube 2 and the metal layer 9, that is, the measuring tube 2 and the metal layer 9 are joined to one another very intimately.

As illustrated in FIG. 4, the metal layer 9 is now allowed to oxidize, that is, a thin oxide layer 10, indicated by dots, appears on its surface. This oxide layer has a relatively small thickness of usually not more than 1 μm, however, which is generally insufficient for electrical insulation. The oxide layer 10 serves, however, as a base layer for a surface layer 11 of a metal oxide (FIG. 5), which is produced, for example, by growing crystals on the oxide layer 10 caused by oxidation of the surface. Here, it is not an oxide bonding to a metal but an oxide bonding to an oxide, which produces an excellent bond. If the metal of the metal layer 9 and the metal of the surface layer 11, formed by the metal oxide, are identical, very intimate and strong bonds between the surface layer 11 and the measuring tube 2 can be created by simple means. The surface layer can be produced by various methods. Besides crystal growing, chemical vapour deposition or sputtering can also be used.

The oxide layer can also be produced, of course, by accelerated oxidation of the inside of the measuring tube. For that purpose, methods such as ion implantation, plasma spraying or treatment with strongly oxidizing reagents can be used, for example.

The surface layer 11 can then be built up successively to such an extent that it has the required thickness of 10 μm or more. The layer created in this manner not only has the necessary electrical resistance, but is also has satisfactory resistance to most fluids flowing through, even when these have a high temperature.

Instead of an oxide layer 11, a nitride layer can also be used, which can be produced in principal in a similar manner. If the measuring tube 2 is chosen to be of the same material as the metal layer 9 (or vice versa), the measuring tube 2 and the metal layer 9 can, of course, be in one piece.

Preferred material combinations are in this case tantalum for the metal layer 9 and tantalum pentoxide for the surface layer 11 or titanium for the metal layer 9 and titanium nitride for the surface layer 11.

We claim:

1. An isolated liner for an electromagnetic flowmeter having a metallic measuring tube made of a non-magnetic material, a set of magnetic coils for generating a magnetic field in a direction substantially at right angles to the direction of flow, an electrode arrangement which is arranged substantially at right angles to the direction of the magnetic field and substantially at right angles to the direction of flow, and an electrical insulator located on an inner surface of the measuring tube, said insulator being constituted by a surface layer of metal oxide or metal nitride having a thickness of more than 10 μm on the inner surface of the measuring tube.

2. A measuring section according to claim 1, in which the surface layer is intimately bonded to the measuring tube.

3. A measuring section according to claim 1, in which a metal layer comprising the metal of the surface layer is arranged between the surface layer and the measuring tube.

4. A measuring section according to claim 3, in which the measuring tube and the metal layer are formed from the same material.

5. A measuring section according to claim 3, in which there is a eutectic bond between the measuring tube and the metal layer, and the surface layer is deposited in the form of a crystalline structure on the metal layer.

6. A measuring section according to claim 3, in which the measuring tube and the metal layer are of one-piece construction and the surface layer is deposited in the form of a crystalline structure on the metal layer.

7. A measuring section according to claim 3, in which the metal layer is formed from tantalum and the surface layer is formed from tantalum pentoxide.

8. A measuring section according to claim 3, in which the metal layer is formed from titanium and the surface layer is formed from titanium nitride.

9. A method for producing an isolated liner for an electromagnetic flowmeter having a metallic measuring tube made of a non-magnetic material, a set of magnetic coils for generating a magnetic field in a direction substantially at right angles to the direction of flow, an electrode arrangement which is arranged substantially at right angles to the direction of the magnetic field and substantially at right angles to the direction of flow, in which an insulator is arranged on an inner surface of the measuring tube, and in which the inner surface of the measuring tube is oxidized or nitrogenized and a metal oxide or a metal nitride is deposited on the resulting oxide or nitride layer.

10. A method according to claim 9, in which before the inside of the measuring tube is oxidized or nitrogenized, a metal layer is deposited on the inside of the measuring tube and this metal layer is oxidized or nitrogenized.

11. A method according to claim 10, in which the metal layer is applied by electrolysis.

12. A method according to claim 9, in which the metal of the metal layer is the same as that of the oxide or nitride layer.

13. A method according to claim 9, in which the oxide or nitride layer is created by growing crystals on the oxidized or nitrogenized surface.

14. A method according to claim 9, in which the oxide or nitride layer is created by chemical vapour deposition or sputtering.

15. A method according to claim 9, in which the oxide or nitride layer is formed by accelerated oxidation or nitrogenization of the inside of the measuring tube.

* * * * *